(12) United States Patent
Roberts et al.

(10) Patent No.: US 8,698,839 B2
(45) Date of Patent: *Apr. 15, 2014

(54) METHODS, SYSTEMS, AND PRODUCTS FOR DISPLAYING OBJECTS

(75) Inventors: Linda A. Roberts, Decatur, GA (US); Hong T. Nguyen, Atlanta, GA (US); Edward Michael Silver, Atlanta, GA (US); Robert G. Hensey, Norcross, GA (US); John L. Bradberry, Jonesboro, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 324 days.

This patent is subject to a terminal disclaimer.

(21) Appl. No.: 12/508,672

(22) Filed: Jul. 24, 2009

(65) Prior Publication Data

US 2009/0284657 A1 Nov. 19, 2009

Related U.S. Application Data

(63) Continuation of application No. 11/475,382, filed on Jun. 27, 2006, now Pat. No. 7,583,274, which is a continuation of application No. 10/120,697, filed on Apr. 11, 2002, now Pat. No. 7,068,291.

(51) Int. Cl.
*G09G 5/00* (2006.01)

(52) U.S. Cl.
USPC ........... 345/629; 345/619; 345/635; 715/781; 715/788; 715/789

(58) Field of Classification Search
USPC .......................................................... 715/745
See application file for complete search history.

(56) References Cited

U.S. PATENT DOCUMENTS

| | | | | |
|---|---|---|---|---|
| 5,075,675 | A * | 12/1991 | Barker et al. | 715/794 |
| 5,435,557 | A * | 7/1995 | Coffey | 463/47 |
| 5,692,143 | A * | 11/1997 | Johnson et al. | 715/764 |
| 5,796,403 | A * | 8/1998 | Adams et al. | 715/803 |
| 5,841,435 | A * | 11/1998 | Dauerer et al. | 715/775 |
| 5,929,854 | A * | 7/1999 | Ross | 715/783 |
| 5,956,000 | A * | 9/1999 | Kreitman et al. | 345/1.3 |
| 6,079,709 | A * | 6/2000 | Ethridge et al. | 273/148 B |
| 6,204,840 | B1 * | 3/2001 | Petelycky et al. | 715/202 |
| 6,549,217 | B1 * | 4/2003 | De Greef et al. | 715/745 |
| 2002/0109725 | A1 * | 8/2002 | Suzuki et al. | 345/769 |
| 2005/0149879 | A1 * | 7/2005 | Jobs et al. | 715/796 |

\* cited by examiner

*Primary Examiner* — Phi Hoang
(74) *Attorney, Agent, or Firm* — Scott P. Zimmerman, PLLC (57) ABSTRACT

Methods, systems, and products are disclosed for displaying objects. A software application is associated to a profile storing display characteristics for the software application. A video display screen is segmented into segments. A video object produced by the software application is mapped to a segment in the video display screen that corresponds to the profile.

14 Claims, 6 Drawing Sheets

METHODS, SYSTEMS, AND PRODUCTS FOR DISPLAYING OBJECTS

CROSS-REFERENCE TO RELATED APPLICATIONS

This application is a continuation of U.S. application Ser. No. 11/475,382, filed Jun. 27, 2006 and now issued as U.S. Pat. No. 7,583,274, which is itself a continuation of U.S. application Ser. No. 10/120,697, filed on Apr. 11, 2002 and now issued as U.S. Pat. No. 7,068,291, with both applications incorporated herein by reference in their entirety.

BACKGROUND OF THE INVENTION

Video display monitors, such as those for displaying computer or television signals, are increasingly becoming relied upon to display a variety of content from a multitude of applications. For example, a computer display may simultaneously display multiple items such as, for example, a message manager, an Internet web browser, a television signal, a calendar, etc. When an application for a new item is started, the item appears on the display at a seemingly random location and is sized to a seemingly random size. The user often has no control over the placement and sizing of an item unless the user manually adjusts the parameters relating to the location and sizing of the item after the application displaying the item has been invoked. As more items are displayed on the display, the manual task of locating and sizing items becomes tedious and may have to be repeated upon each invocation of an application.

SUMMARY OF THE INVENTION

In one embodiment, the present invention is directed to an apparatus for controlling the format of a video display. The apparatus includes a profile module for defining at least one profile. The profile has at least one display characteristic of video information associated with a type of application. The apparatus also includes a runtime engine in communication with the profile module. The runtime engine accepts the video information, modifies the video information according to the profile, and outputs the modified video information.

In another embodiment, the present invention is directed to a method of segmenting a video display. The method includes creating a profile by associating a display characteristic with an application and accepting video information associated with the application. The method also includes modifying the video information according to the profile and outputting the modified video information.

BRIEF DESCRIPTION OF THE DRAWINGS

Further advantages of the present invention may be better understood by referring to the following description taken in conjunction with the accompanying drawings, in which.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, other elements. For example, certain operating system and display details and modules are not described herein. Those of ordinary skill in the art will recognize, however, that these and other elements may be desirable. However, because such elements are well known in the art, and because they do not facilitate a better understanding of the present invention, a discussion of such elements is not provided herein.

The present invention relates to systems and methods for segmentation of a video display, or video screen, such as those found on television sets or computer monitors, into virtual video sectors, areas, or regions. A user may interactively manage the segmentation of the screen by assigning screen areas and display priorities for applications or groups of applications. The term "application" as used herein may include any type of device, system, or apparatus that outputs graphical information to a video display.

Figure 1:
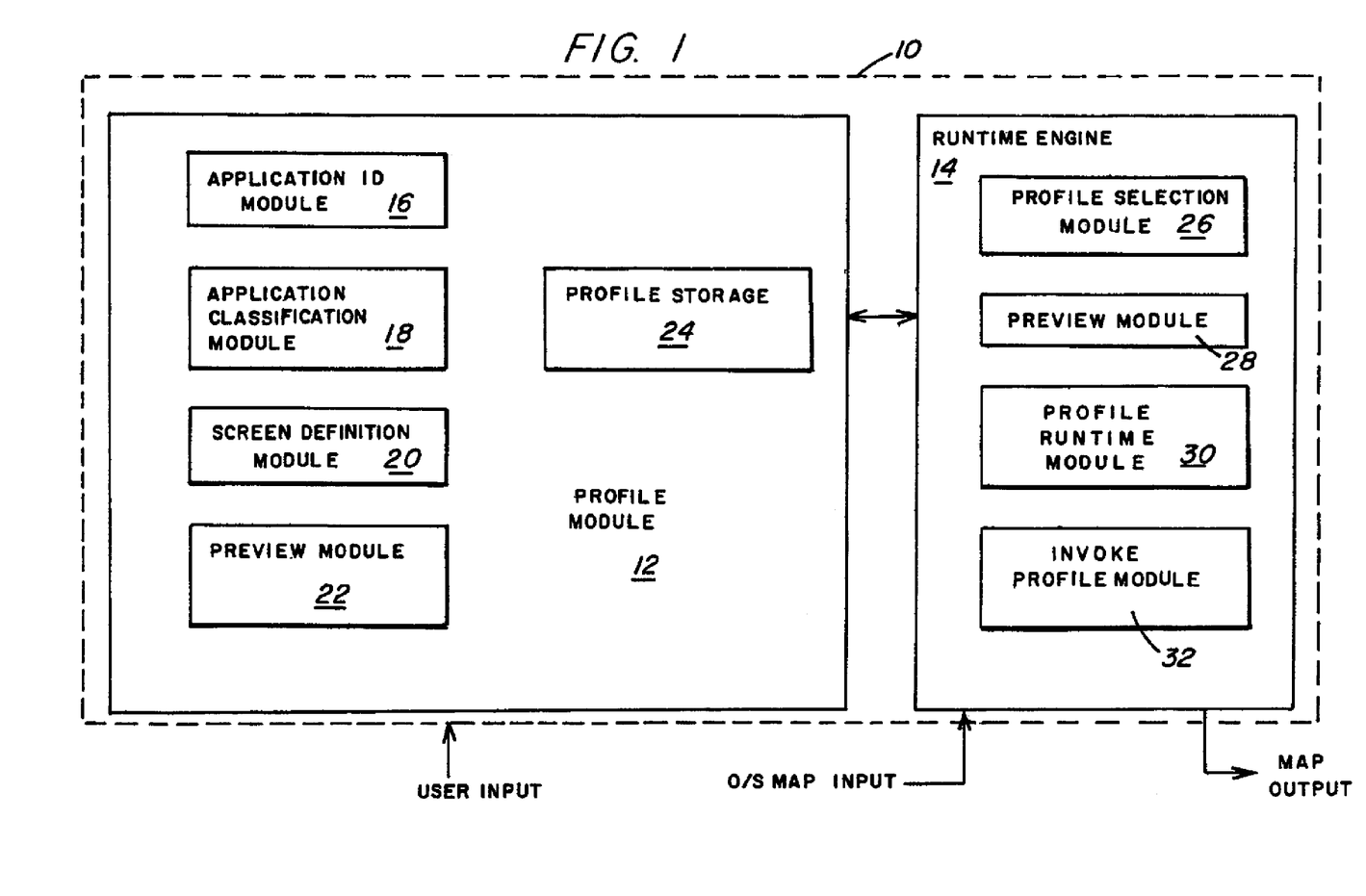
FIG. 1 is a block diagram of a video segmentation apparatus according to one embodiment of the present invention.

FIG. 1 is a block diagram of a video segmentation apparatus 10 according to one embodiment of the present invention. The apparatus 10 includes a profile module 12 and a runtime engine 14. The profile module 12 allows a user of, for example, a computer on which the apparatus 10 is resident, to define a profile for that user's video viewing preferences (e.g. the size and location of a particular video object that is to be displayed by an application). The runtime engine 14 translates video address maps from a computer operating system into output video address maps for the local video space that take into account the user's preferences.

The profile module 12 and the runtime engine 14 each contain various modules (i.e. sub-modules). The profile module 12 includes an application identification module 16. The application identification module 16 allows the user of the apparatus 10 to identify various applications for which a profile will be created. An application classification module 18 creates groups, or classes, of applications for which the user desires to have the same display characteristics. A screen definition module 20 allows the user to define the display characteristics to create a profile for each group. A preview module 22 allows the user to preview a profile or multiple profiles on the display screen. Each profile for each class is stored in profile storage 24. The profile storage 24 may be any suitable storage medium such as, for example, a magnetic medium such as a floppy disk or a computer hard disk drive, or an optical medium such as a compact disc.

The runtime engine 14 controls the characteristics of the display device during operation. A profile selection module 26 allows the user to select the profile or profiles that should be used during operation. A preview module 28 operates similarly to the preview module 20 of the profile module 12, but it allows the user to preview a profile or profiles without invoking the profile module 12. A profile runtime module 30 performs the mapping of an input operating system video address map to an output video address map that is in conformance with the profile or profiles that the user has selected using the profile selection module 26. It can be understood that the present invention may be used in conjunction with any type of operating system because the engine 14 operates on the video address map. An invoke profile module 32 allows the user to invoke the profile module 12 so that the user can, for example, edit or create profiles.

The various modules of the apparatus 10 may be implemented in, for example, computer hardware or computer software code using, for example, any suitable type of computer language such as, for example, C, C++, or Java using, for example, conventional or object-oriented techniques. The various modules (or portions thereof) of the apparatus 10 may be stored on a computer-readable medium such as, for example, a magnetic medium such as a floppy disk or a computer hard disk drive, or an optical medium such as a compact disc. The profile module 12 may be implemented as, for example, a "wizard" application that allows the user to, for example, create and edit profiles using user-friendly menus in a step-by-step process.

Figure 2:
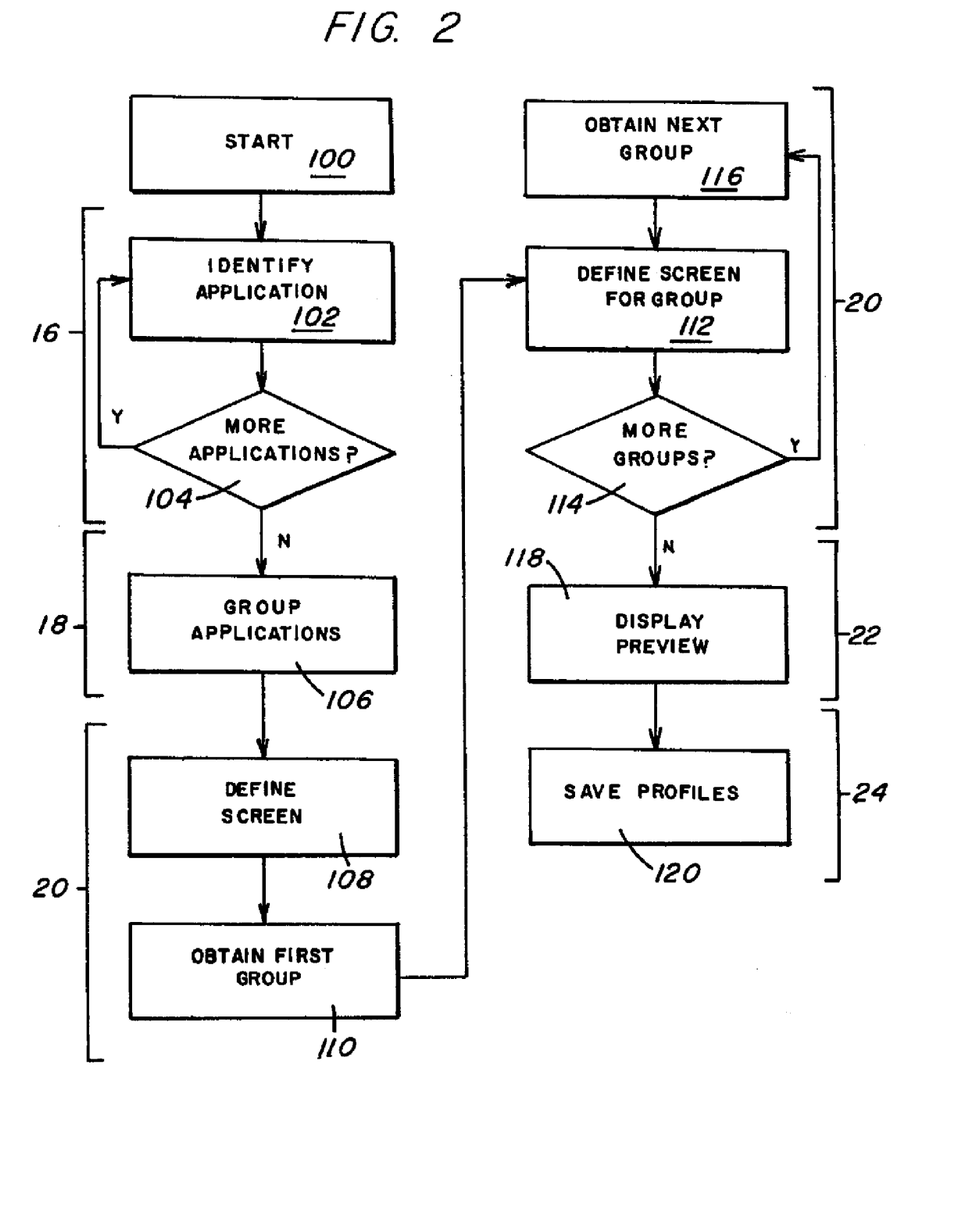
FIG. 2 is a flow diagram showing a process flow through the profile module of FIG. 1 according to one embodiment of the present invention.

FIG. 2 is a flow diagram showing a process flow through the profile module 12 of FIG. 1 according to one embodiment of the present invention. The process starts at step 100. At step 102, the user identifies an application that is to be mapped to the display. At step 104, the process determines if the user would like to identify more applications. If so, the process returns to step 102. If not, the process advances to step 106, where the user classifies applications into groups. A group can include, for example, applications that are similar and which the user would like to have similar display priorities and display characteristics (e.g. location on the display).

At step 108, the real and virtual sizes of the display screen are defined. The definition process may be aided by, for example, the profile module 12 having access to such parameters (e.g. from the operating system) for common makes and models of commercially-available displays. At step 110 the process obtains the first group for profile creation and at step 112 the characteristics of the display for the selected group are defined as a profile for that group. For example, the screen region, identified by the region's pixels, where the applications associated with the selected group will be displayed is defined.

At step 114, the process determines if another group needs to have a profile defined. If so, the process advances to step 116 where the next group to be defined is obtained and the profile for that group is defined at step 112. If no more groups were available for processing at step 114, the process advances to step 118 where a preview of the various profiles is available for viewing by the user. At step 120, the profiles that were created are stored in the profile storage 24.

It can be understood that in various embodiments of the process illustrated in FIG. 2, the process may have additional steps. For example, after step 118, in one embodiment the user may re-enter the process at any point to change groupings, redefine profiles, etc. if, for example, the user is not satisfied with the display previewed at step 118. Also, in one embodiment a user may select display characteristics that are to be used when displaying video content from applications that were not placed in a group—i.e. the user can define a profile to be used as a default profile. Furthermore, in one embodiment a user may define an application or group of applications for which video content is not to be displayed. In a further embodiment, a user may be given remote access to the profile module 12 via, for example, email, remote assistance (i.e. a "hotline"), or the Internet so that the user may create or modify a profile remotely.

Figure 3:
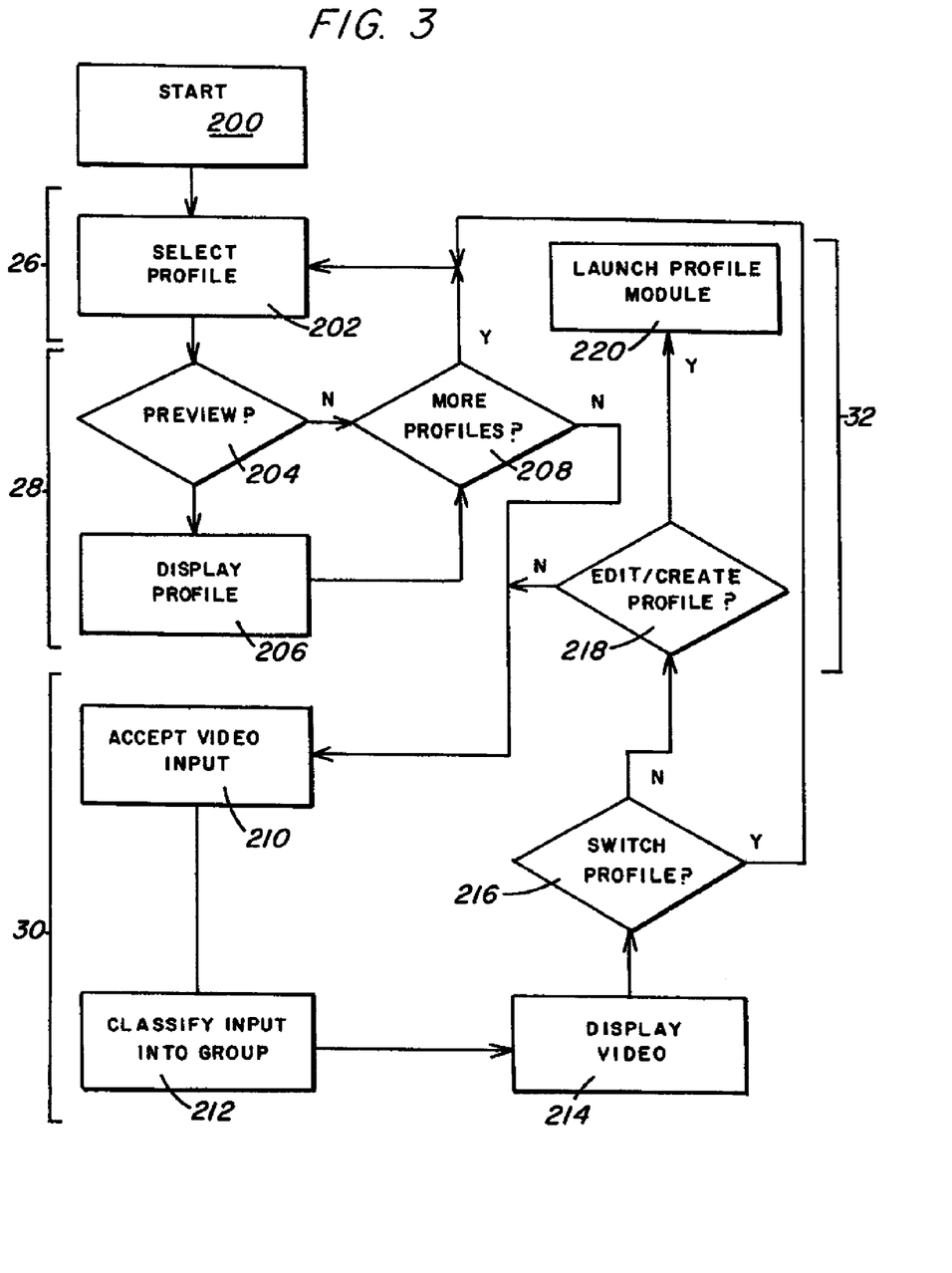
FIG. 3 is a flow diagram showing a process flow through the runtime engine of FIG. 1 according to one embodiment of the present invention.

FIG. 3 is a flow diagram showing a process flow through the runtime engine 14 of FIG. 1 according to one embodiment of the present invention. The process starts at step 200 either, for example, automatically on startup of a computer or manually by a user. At step 202 the user selects a first profile that is to be used to construct the display during operation of the runtime engine 14. In one embodiment, a profile or multiple profiles are automatically selected when the engine 14 is invoked. The user may then select an alternate profile or profiles at any time during execution of the engine 14. At step 204, the process determines if the user wants to preview the selected profile on the display. If so, the process displays how the profile will appear on the display during runtime at step 206.

At step 208, the process determines if the user desires to select additional profiles. If so, the process returns to step 202 for the user to select another profile. If the user does not desire to select additional profiles, the process advances to step 210, where the runtime engine begins its runtime operation by accepting a video address map from an operating system. At step 212, the process classifies each portion of the address map into a group, as defined hereinabove in conjunction with FIG. 2. The process matches each group to a profile, translates the input address map into an output address map, and the video is displayed according to the relevant profile or profiles at step 214.

After the video has been displayed at step 214, the process determines if the user desires to select a different profile for a portion of the display at step 216. If so, the process advances to step 202 where the user may select another profile. If the user does not desire to select a different profile, the process advances to step 218 where the process determines if the user desires to edit or create a profile. If the user desires to edit or create a profile, the process advances to step 220 where the profile module 12 is invoked. If the user does not want to edit or create a profile, the process returns to step 210. It can be understood that steps 216 and 218 need not prompt the user after each display at step 214. Instead, the user can select, for example, a profile switch option or a profile edit/create option that will act as, for example, interrupts at any time during execution of the process. The interrupts would then interrupt the process after the video is displayed at step 214.

Figure 4:
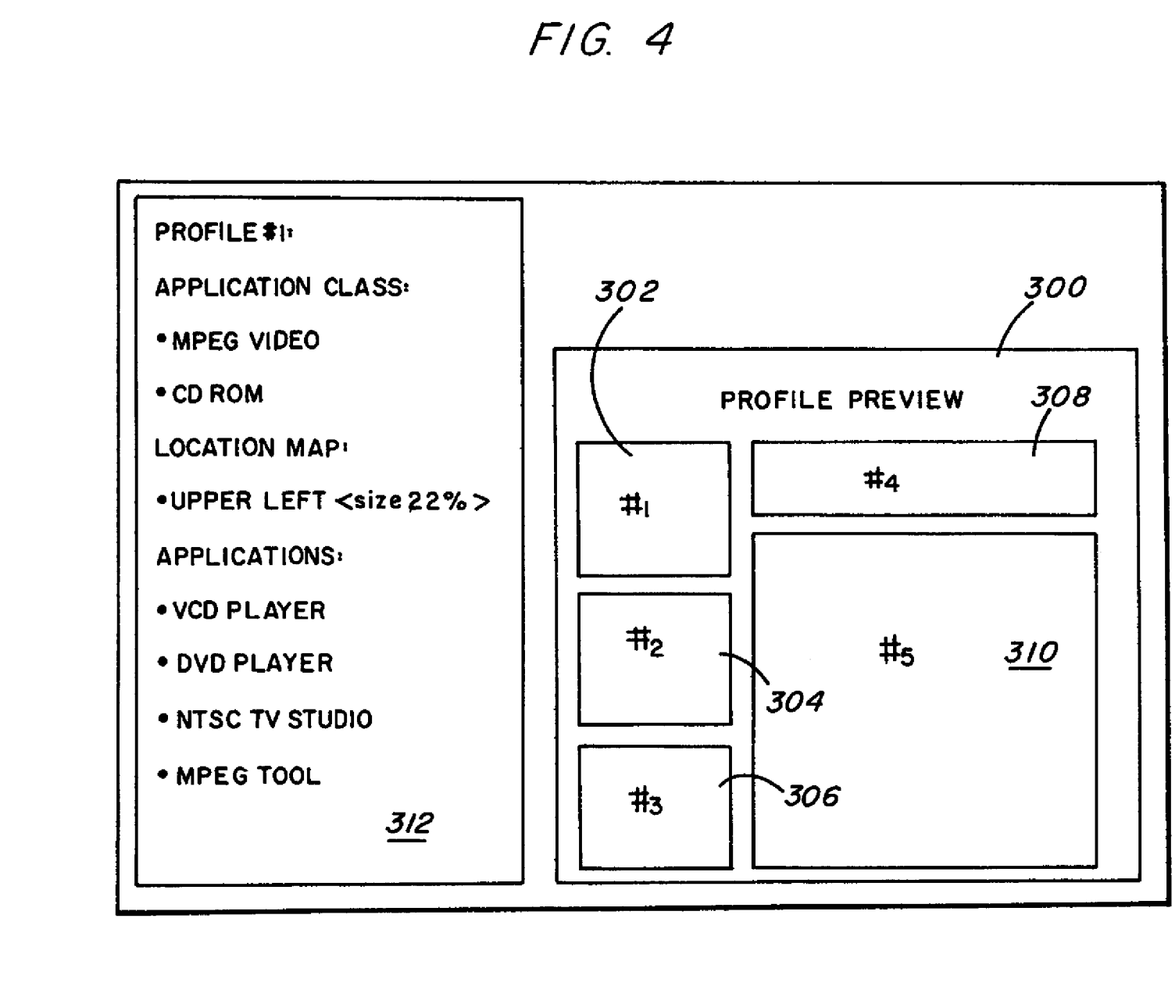
FIG. 4 is an example of a graphical user interface for the profile module of FIG. 1 according to one embodiment of the present invention.

FIG. 4 is an example of a graphical user interface for the profile module 12 of FIG. 1 according to one embodiment of the present invention. The interface shows a profile preview 300 generated by the preview module 22. Each of the numbered regions 302, 304, 306, 308, 310 illustrates a profile that was created for various groups of applications. The preview 300 shows how each group will be displayed during runtime by the runtime engine 14. A profile setup 312 displays the characteristics of each of the profiles. For example, the setup 312 illustrates the characteristics of the profile for the region 302. As can be seen, the profile associated with the region 302 includes groups having MPEG video and CD ROM applications. The applications associated with those groups include a VCD player, a DVD player, an NTSC TV studio, and an MPEG tool. The profile for those groups specifies that applications requesting display space should be displayed in the upper left of the display and sized at 22%.

Figure 5:
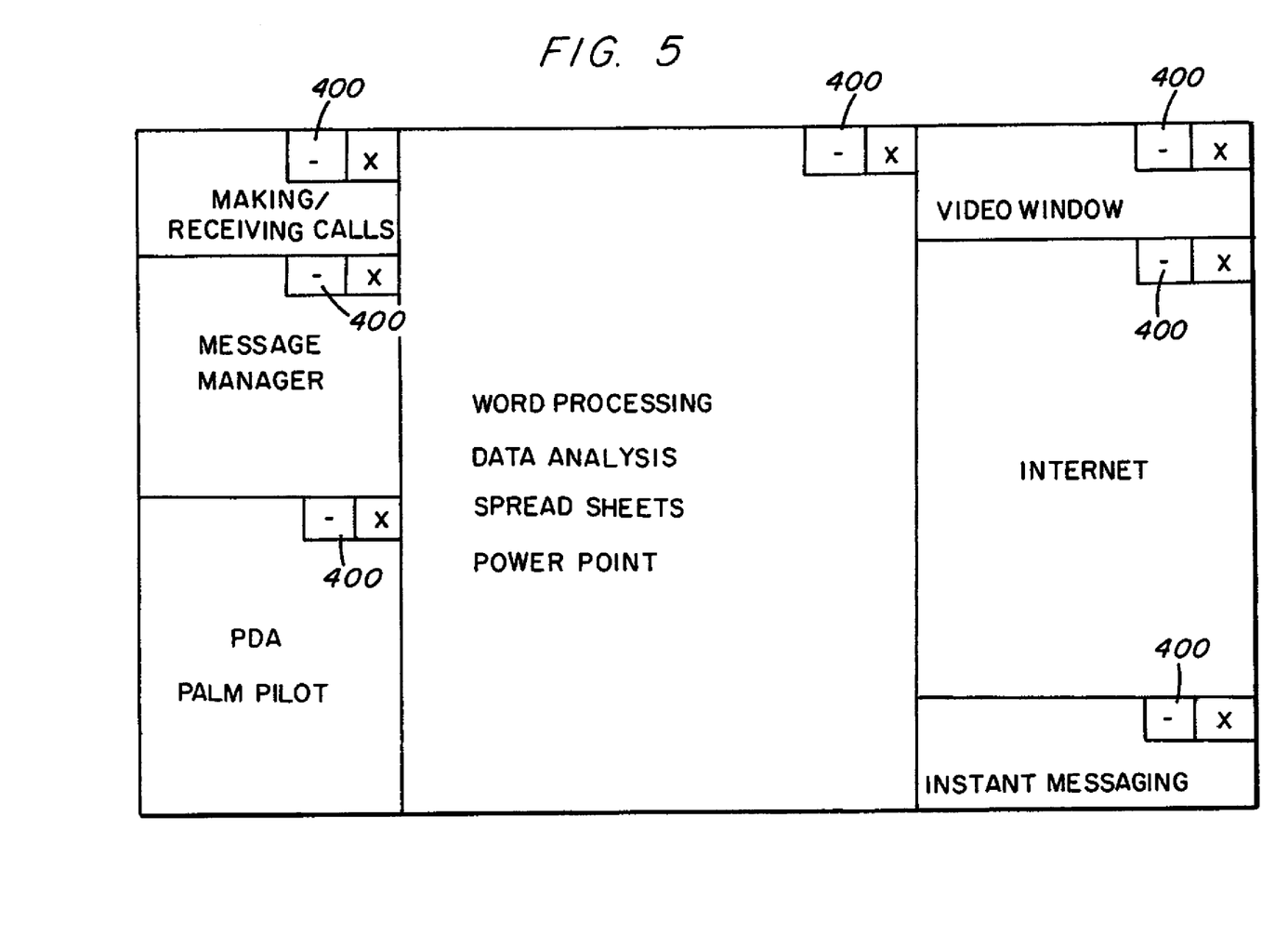
FIGS. 5 and 6 are examples of screen segmentations according to embodiments of the present invention.
Figure 6:
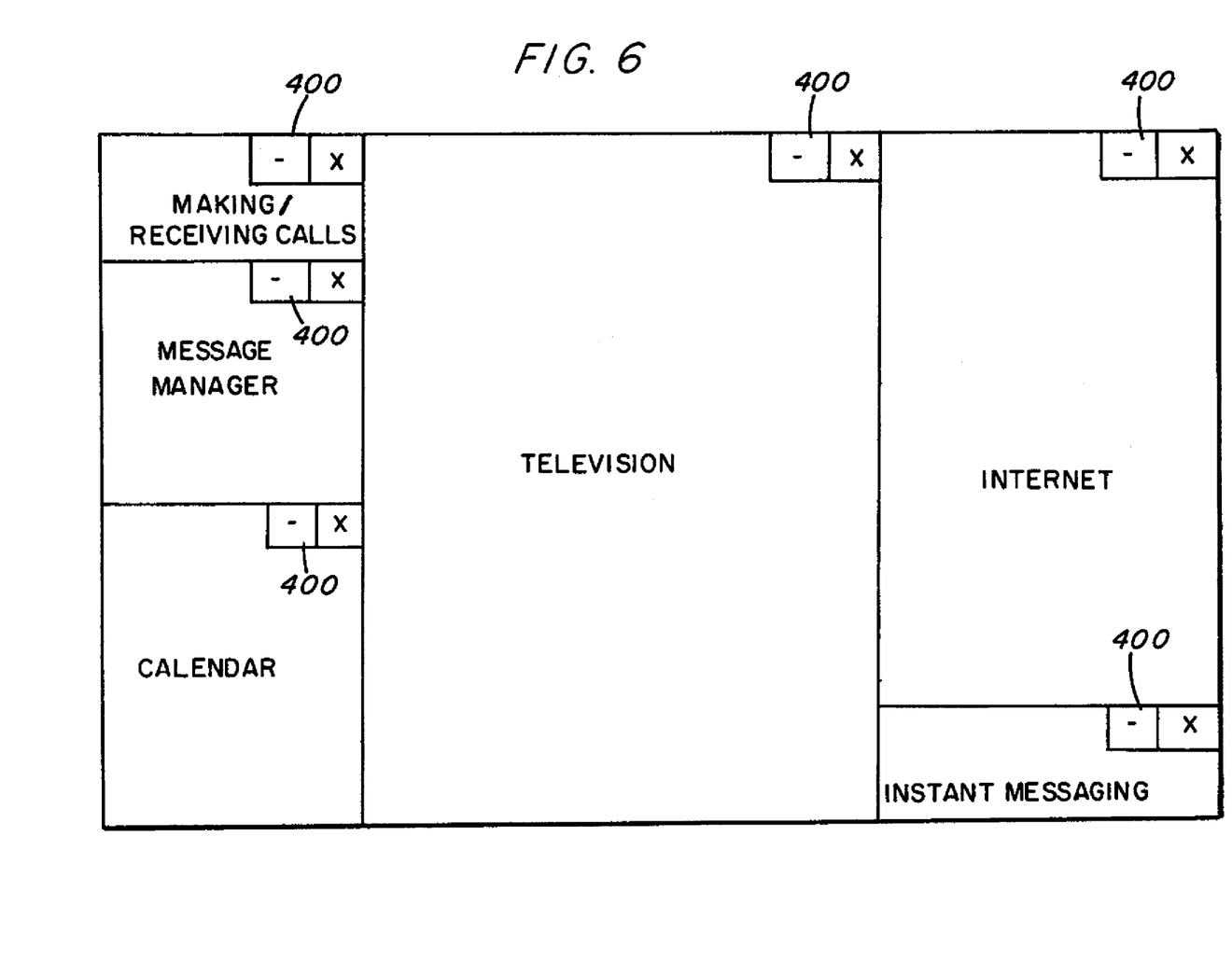

FIGS. 5 and 6 are examples of screen segmentations according to embodiments of the present invention. As can be seen from FIGS. 5 and 6, the number of combinations of screen segmentations is limitless and a user can define profiles according to the user's interests and needs. Also, in one embodiment of the invention, the apparatus 10 may contain pre-defined template screen segmentations and their attendant profiles so that a user can select a template and does not have to define segmentation preferences. In one embodiment of the present invention, each region may contain an adjustment object 400. The objects 400 may allow a user to minimize, close, move, or resize a region or to change or delete the profile associated with a region.

Although FIGS. 5 and 6 illustrate a segmentation in which the regions are non-overlapping, it can be understood that there can be any combination of overlapping and non-overlapping regions. Also, the present invention may be used when a video space is larger than the capacity of its attendant video display (e.g. in the case of a panning display) and when a video space spans across multiple displays (e.g. dual head displays).

While several embodiments of the invention have been described, it should be apparent, however, that various modifications, alterations and adaptations to those embodiments may occur to persons skilled in the art with the attainment of some or all of the advantages of the present invention. It is therefore intended to cover all such modifications, alterations and adaptations without departing from the scope and spirit of the present invention as defined by the appended claims.

The invention claimed is:

1. A method, comprising:
storing profiles of video viewing preferences for a user of a video display, each profile in the profiles of video viewing preferences associating a plurality of display characteristics to a group of multiple different software applications;
assigning an area of a video display screen of the video display, a display priority, and a display size to each group of the multiple different software applications;
segmenting the video display screen of the video display into segments;
receiving video information associated with different software applications;
determining the group of multiple different software applications associated with the different software applications;
retrieving a profile associated with the group of multiple different software applications;
retrieving from the profile a region of the video display assigned to the group of multiple different software applications;
determining an exclusion from the profile of one of the different software applications from display;
excluding display of the video information associated with the one of the different software applications in response to the exclusion;
modifying remaining video information according to the profile to generate modified video information;
receiving a profile switch option after modification of the remaining video information;
simultaneously displaying the remaining video information in a segment according to the profile along with a different group of multiple different software applications in a different segment of the video display screen;
displaying an adjustment object that resizes the region of the video display; and
interrupting further processing of the remaining video information after display according to the profile switch option.

2. The method according to claim 1, further comprising associating the group of multiple different software applications to a make and model of the video display screen.

3. The method according to claim 1, further comprising retrieving from the profile an area of the region in which the group of multiple software applications is displayed.

4. The method according to claim 1, further comprising retrieving from the profile a template that predefines the segments of the video display screen.

5. The method according to claim 1, further comprising overlapping different segments of the video display screen.

6. The method according to claim 1, further comprising defining a default profile.

7. A system, comprising:
a processor; and
memory storing code that when executed causes the processor to perform operations, the operations comprising:
storing profiles of video viewing preferences for a user of a video display, each profile in the profiles of video viewing preferences associating a plurality of display characteristics to a group of multiple different software applications;
segmenting a video display screen of the video display into segments;
assigning an area of the video display, a display priority, a segment, and a display size to each group of the multiple different software applications;
receiving video information associated with different software applications;
determining the group of multiple different software applications associated with the different software applications;
retrieving a profile associated with the group of multiple different software applications;
retrieving from the profile a region of the video display assigned to the group of multiple different software applications;
determining an exclusion from the profile of one of the different software applications from display;
excluding display of the video information associated with the one of the software applications in response to the exclusion;
modifying remaining video information according to the profile associated with the group of multiple different software applications to generate modified video information;
receiving a profile switch option after modification of the remaining video information;
simultaneously displaying the remaining video information in a segment according to the profile along with a different group of multiple different software applications in a different segment of the video display screen;
displaying an adjustment object that resizes the region of the video display; and
interrupting further processing of the remaining video information after display according to the profile switch option.

8. The system according to claim 7, wherein the operations further comprise translating an input video address map into an output video address map according to the profile.

9. The system according to claim 7, wherein the operations further comprise associating motion picture expert group video to the profile.

10. The system according to claim 7, wherein the operations further comprise retrieving a template from the profile.

11. The system according to claim 7, wherein the operations further comprise defining pixels in the video display screen associated with the group of multiple different software applications.

12. A memory storing instructions which, when executed by a processor, cause the processor to perform operations, the operations comprising:
storing profiles of video viewing preferences for a user of a video display, each profile in the profiles of video viewing preferences associating a plurality of display characteristics to a group of multiple different software applications;

segmenting a video display screen of the video display into segments;

assigning an area of the video display, a display priority, a segment, and a display size to each group of the multiple different software applications;

receiving video information associated with different software applications;

determining the group of multiple different software applications associated with the software applications;

retrieving a profile associated with the group of multiple different software applications;

retrieving from the profile a region of the video display assigned to the group of multiple different software applications;

determining an exclusion from the profile of one of the different software applications from display;

excluding display of the video information associated with the one of the different software applications in response to the exclusion;

modifying remaining video information according to the profile associated with the group of multiple different software applications to generate modified video information;

receiving a profile switch option after modification of the remaining video information;

simultaneously displaying the remaining video information in a segment according to the profile along with a different group of multiple different software applications in a different segment of the video display screen;

displaying an adjustment object that resizes the region of the video display; and interrupting further processing of the remaining video information after display according to the profile switch option.

13. The memory according to claim 12, wherein the operations further comprise translating a video address map into an output video address map.

14. The memory according to claim 12, wherein the operations further comprise retrieving a template from the profile.

* * * * *